April 11, 1961 G. J. LEIGHTON 2,979,649
SERVOSYSTEM FOR CONTROLLING THE MASS CONTENT OF A PRODUCT
Original Filed Oct. 20, 1954 2 Sheets-Sheet 1

Inventor
GEOFFREY JAMES LEIGHTON
by: John Richard Cavanagh
Agent

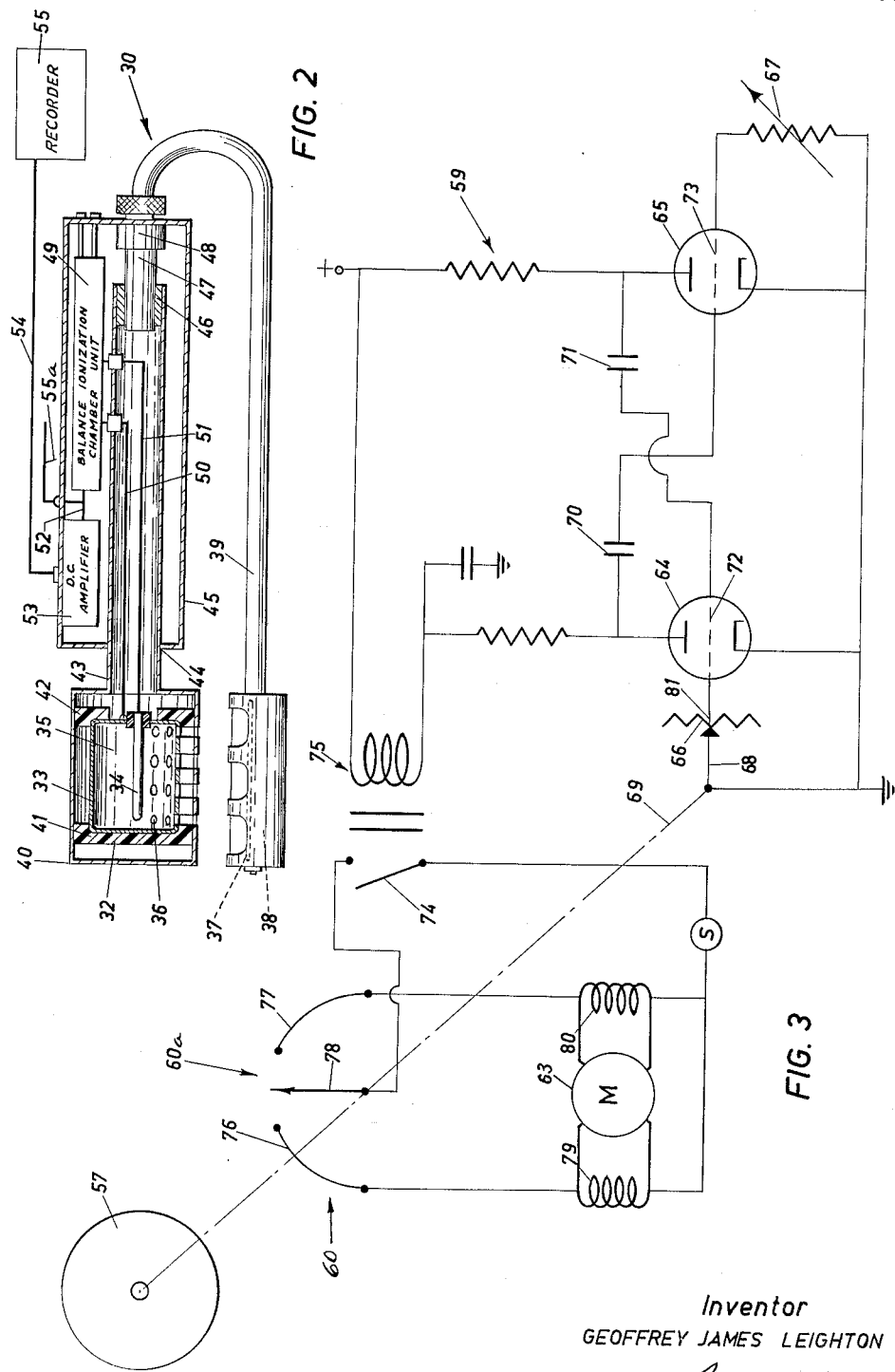

United States Patent Office 2,979,649
Patented Apr. 11, 1961

2,979,649

SERVOSYSTEM FOR CONTROLLING THE MASS CONTENT OF A PRODUCT

Geoffrey James Leighton, Oakville, Ontario, Canada, assignor to Canadian Curtiss-Wright, Limited, a corporation of Canada Continuation of application Ser. No. 463,458, Oct. 20, 1954. This application Sept. 9, 1958, Ser. No. 760,044

6 Claims. (Cl. 318—480)

This invention relates to method and apparatus for controlling the amount of raw material fed to a process converting the material into a finished product, proportional to the error in raw material feed.

Heretofore, weighing devices have been employed in various arts for continuously weighing material being fed to processing apparatus. Such weighing devices are responsive to the weight of the material as it is being fed and are not responsive to the character of the product formed from the material. It will be obvious that the purpose of controlling the weight of material being fed into an article producing process is to produce a consistent finished article. So far as is known, no device has heretofore been proposed which is capable of controlling the rate of feed of a mass of material responsive to the mass content, i.e., the mass per unit area or mass per unit volume of a product processed from the material. For the purposes of the invention, the device disclosed in United States Patent 2,675,483, issued April 13, 1954, and assigned to the same assignee as the present invention, is employed for detecting the mass per unit area of a sheet-like product. The device disclosed in the said patent provides a signal responsive to the mass per unit area of a sheet-like product passed between the emitter source material such as thallium 204 and a detector disposed to accept unabsorbed radiation from the other side of the material being examined.

It is accordingly the main object of the present invention to provide a method and apparatus for measuring the deviation in mass per unit area of a product in finished or semi-finished state from a desired value and converting said measurement to an electrical signal proportional to said deviation, whereby a material metering and feeding device may be controlled to correct the flow of material to apparatus providing said product.

Another object of the invention is to provide a method of maintaining a substantially constant mass content in a product continuously formed by a process from a raw material, comprising continuously measuring the mass of said product as it is produced, responsively varying the rate of feed of raw material to said process proportionally to compensate for variation in the mass of said product, and delaying further variation of said feed responsive to said measurement until the mass of said product derived from material fed at said compensated rate is measured.

A further object of the invention is to provide apparatus for controlling the mass content of a continuous product delivered from a process and formed from at least one raw material fed to said process comprising in combination, a detector responsive to a change in the mass per unit area of said product from a predetermined value for generating an electrical signal proportional to said change; a timing device responsive to said signal providing electrical pulses of a duration proportional to said change separated by a time period substantially corresponding to the time required for a change in material feed to be detected by said detector; and means responsive to both said electrical signal and said pulses, controlling said material feed to compensate for said change.

Other objects of the invention will be appreciated by a study of the following specification taken in conjunction with the accompanying drawings.

In the drawings:

Figure 2 is a sectional view of apparatus for measuring the mass per unit area of a product such as a sheet of material and disclosed in more detail in U.S. Patent 2,675,483.

Figure 3 is a diagrammatic electrical schematic of an electronic control device of the invention for controlling the material metering device, i.e., the gate valve modifying the feed of the raw material in the illustration of Figure 1.

Figure 1:
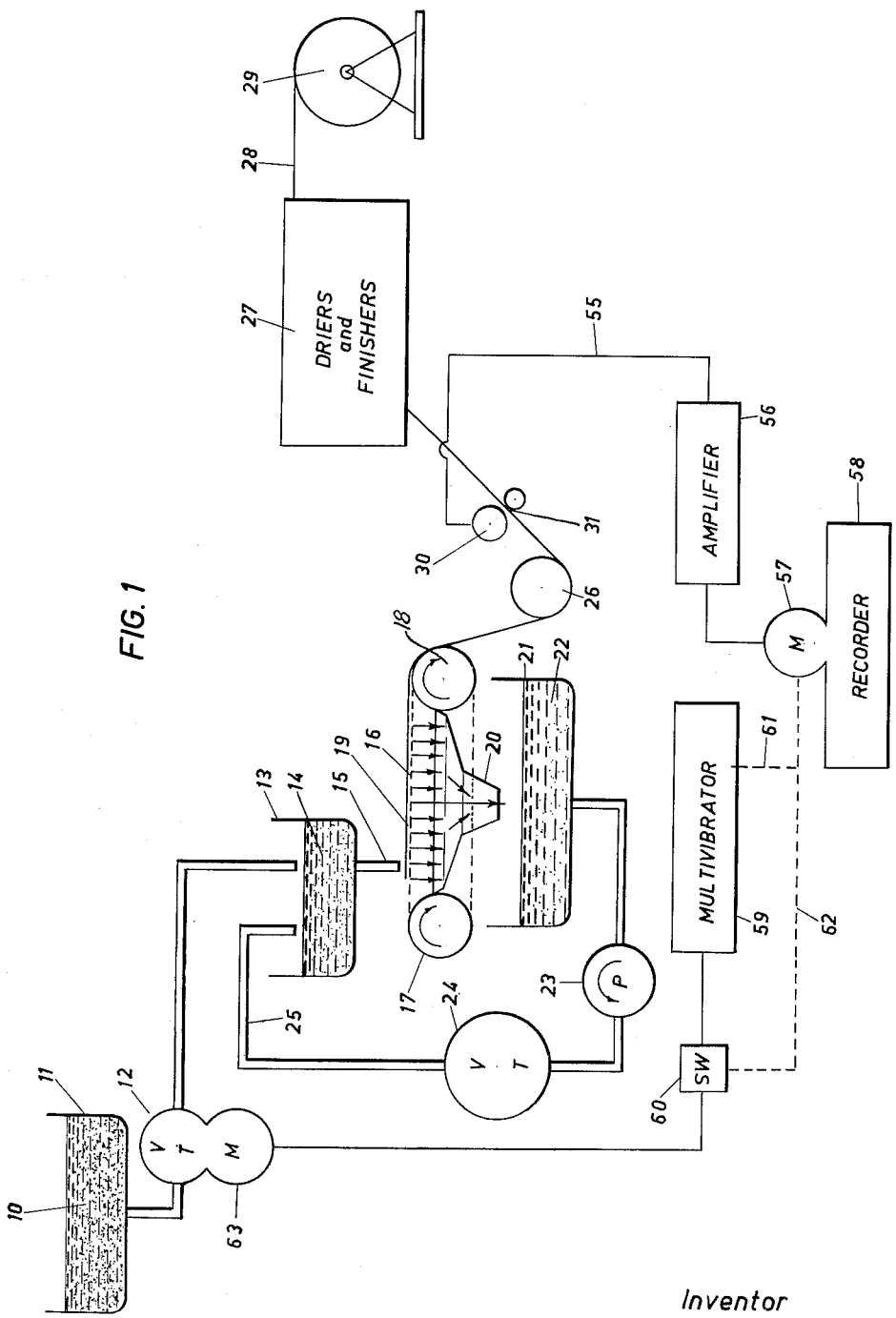
Figure 1 is a flow diagram of one type of process to which the invention may be applied, namely, a paper-making process, illustrating the relation of material metering and controlling devices of the invention.

In Figure 1, the invention is illustrated as being applied to a paper-making process wherein raw paper stock 10 in liquid suspension in vat 11 flows through flow controlling valve 12 in line 12a to the stock distributing box 13 from which raw stock 14 therein is distributed by a distributing outlet 15 over the conveyor screen 16 mounted on rollers 17 and 18 and supported by idlers (not shown) as may be required. The raw stock forms a layer 19 on the screen 16 and excess liquid including some entrained raw stock is drawn through the screen 16 to discharge trough 20 into the recirculating vat 21 from which the very high liquid surplus stock 22 is pumped by the pump 23 through gate valve 24 and line 25 back to the stock distributing box 13. As the deliquified stock passes over roller 18, it is drawn under roll 26 and passed to suitable drying and finishing apparatus 27 from which the finished product 28 may be wound on a suitable roll 29.

According to the invention, a device 30 is employed for measuring the mass per unit area of the raw sheet as at 31. Whether or not it is desirable to measure the mass per unit area of a product at an intermediate or finished stage, depends largely upon the character of the process and the time lag required for passage of the material of the product from the feed control to the final stage.

The device 30 is shown in more detail in Figure 2 and comprises a radiation responsive detector 32 preferably in the form of an ionization chamber having a cylindrical outer electrode wall 33 spaced from an inner electrode or collector 34 and containing in the annular space 35, a gas under pressure adapted to be ionized by radiation bombardment to cause a current to flow between the electrodes. The cylindrical wall electrode 33 carries a plurality of openings 36 effectively providing an aperture angle or angle of acceptance of less than 180 degrees but preferably greater than the angle of emission from the beta emitting source material 37 in the emitter housing 38 on the under arm 39 of the apparatus. An outer housing 40 supports the ionization chamber 32 by means of insulating blocks 41 and 42. A tubular support arm 43 extends from the housing 40 through an opening 44 in the amplifier "A" case 45 for engagement by the sleeve 46 on the free end thereof over the post 47 of fitting 48, the latter also being supported by the amplifier housing 45. The amplifier housing 45 contains therewithin an adjustable balancing ionization chamber unit 49 connected by leads 50 and 51 passing into the arm 43 for connection to the electrode 33 and collector 34 of the ionization chamber 32. The balancing ionization chamber unit is connected by a suitable cable 52 to a direct current amplifier 53 of a design and construction known to skilled persons. The direct current amplifier may be connected by a line 54 to a recorder 55. When used for measuring the thickness variation of a continuous sheet, the balancing unit 49 is adjusted to zero signal so that the recorder reads on a null point or medium line for the desired sheet thickness and therefore is responsive to variations from this setting.

Referring again to Figure 1, the device 30 or equivalent is connected by an output cable 55a connecting directly to cable 52 in Figure 2 to an external amplifier 56 controlling a motor 57 actuating a second recorder device 58 preferably of the pen type and which may be located at gate valve 12. Motor 57 is of the reversible type and accordingly the recorder 58 will show increasing and decreasing variations in the weight, i.e., the mass per unit area of the raw sheet stock at 31. An electronic relaxation oscillator preferably in the form of a multivibrator unit 59 of conventional construction is adapted to actuate the switch 60 responsive to actuation of motor 57 which latter is mechanically connected as indicated by chain lines 61 and 62 to both the multivibrator and switch device 60. Switch device 60 controls the actuation of the reversible motor 63 controlling valve 12 in a manner hereinafter set forth in more detail.

The multivibrator unit 59 and reversing switch device 60 are shown schematically in Figure 3 wherein electronic valves or tubes 64 and 65 are connected in a multivibrator circuit arrangement of conventional form producing square wave pulses varied by changing the adjustment of variable resistors 66 and 67. The wiper 68 of resistor 66 is mechanically connected to the pen drive shaft 69 of recorder 58 driven by motor 57.

One accepted theory assumes that the cessation of current in tube 64 causes the plate voltage thereof to rise and the start of current in tube 65 causes the plate voltage thereof to fall. Since the plate voltage of the tube 64 is impressed across the series combination of resistor 67 and condenser 70 and the plate voltage of tube 65 is impressed across the series combination of resistor 66 and condenser 71, the sudden change in plate voltage causes a condenser discharging current to flow out of condenser 70 and a charging current to flow into condenser 71. The flow of current out of condenser 70 through resistor 66 biases grid 72 of tube 64 negatively and prevents the latter from conducting. The negative bias of tube 64 eventually becomes so small that plate current starts flowing in the tube and the circuit triggers. The transfer of current from tube 64 to tube 65 is followed by a similar series of events, during which the grid 72 is positive and grid 73 of the tube 65 negative. As condenser 70 charges and condenser 71 discharges, the condenser currents and hence the grid biasing voltages, become smaller until the current again triggers. The cycle repeats but is modified by manual adjustment of variable resistor 67 controlling time during which tube 64 is not conducting and hence the time during which switch 74 of relay 75 in the plate circuit thereof is open.

The length of time during which tube 64 conducts and switch 74 of the relay 75 is closed, depends upon the adjustment of resistor 66 which is operatively related to pen drive shaft 69 of recorder 58 driven by reversible motor 57 in turn controlled by the mass per unit area measuring device 30 of Figures 1 and 2.

In Figure 3, spaced apart contact arms 76 and 77 of reversing switch 60 are adapted to be traversed by switch arm 78 operably related to pen drive shaft 69 and selectively determine energization of field coils 79 and 80 of the reversible substantially constant speed valve drive motor 63 of Figure 1.

As noted in prior United States Patent 2,675,483 in measuring the thickness of a sheet of material, the mass per unit area measuring device is adjusted to balance the measuring system to an average thickness indication. In the present instance, the device is adjusted to a null balance point corresponding to the weight of paper desired to be formed at the point 31 of Figure 1, as before mentioned. The pen recorder operated by the said device develops a reading which fluctuates above and below the average value established by this balancing operation in accordance with a decrease or increase in mass per unit area of the sheet from the average value at which adjustment was made. Therefore, the pen drive shaft 69 at zero signal corresponding to the said average thickness measurement will be in a position locating the wiper 68 of variable resistor 66 at the null point 81 of zero resistance in the grid circuit of tube 64.

In operation, as wiper 68 moves to either side of null point 81, responsive to variations in sheet thickness at 31 of Figure 1, tube 64 will be non-conducting for a period of time in each cycle corresponding to adjustment of resistor 67 fixing the non-conducting period or "delay" to a value corresponding substantially to the time of travel of material being processed from gate valve 12 of Figure 1 to point 31. The duration of the conduction through tube 64 depends upon an effectively instantaneous value of the grid resistor 66 determined by deviation from the null point 81. The period of time during which the switch 74 of relay 75 is closed is therefore proportional to motion of the pen shaft 69 and hence proportional to the signal generated by the measuring device responsive to change in mass per unit area of the raw sheet at 31.

The valve actuating motor 63 drives the mechanism of valve 24 at constant speed in opening or closing motion thereof. Accordingly, motor 63 will be energized in a direction according to the direction of deviation from the null point of rotation of pen shaft 69 since switch arm 78 is also actuated by the pen shaft to engage either contact arm 76 or contact arm 77. The duration of energization is controlled by relay 75 and hence the opening or closing of the valve 12 will be responsive to and substantially proportional to the time during which relay 75 is closed.

The motor reversing switch 60 is ineffective for small variations in mass per unit area measurement in order to reduce the sensitivity of the apparatus herein to a value corresponding substantially to the accuracy with which the product can be made with the apparatus and method of the particular process being controlled. For example, the space between the inner end of contact arms 76 and 77 may represent a deviation about the desired paper weight of less than about one-half of one percent of the said weight. Accordingly, motor 57 will not be responsive to deviations to which switch 60 is not sensitive. Preferably, the speed of actuation of gate valve 12 should be sufficiently great that the time required for motor 63 to move the valve gate from the fully closed position to the fully open position or vice versa is less than the delay time. Preferably also, the time required to adjust the gate valve to compensate for the maximum expected deviation should be much less than the delay period and preferably less than one-tenth of the delay time in most applications of the invention.

In the present example, the delay period may be of the order of two minutes representing the time required for material to flow from valve 12 to the point 31. The time required for motor 63 to actuate the valve 12 to compensate for an expected maximum deviation may be of the order of ten seconds in the present example.

In summary, when the recorder pen (not shown) moves away from the control point representing desired density of a sheet to a point outside the sensitivity gap 60a of switch 60, either contact arm 76 or 77 will be engaged by armature 78. If this occurs when relay switch 74 is closed, the valve gate will be moved in a direction restoring the recorder pen to the control point when the effect of the correction is measured by the device 30. If no further correction is necessary, i.e., the pen has moved "B" to the null point, the valve will remain at its new opening until the pen again deviates from the null or control point sufficiently to actuate the motor 63.

In the prior art, there have been several approaches to proportional control. In all these systems, the proportional action is applied continuously and re-set is added to reposition the control valve should the load conditions change. A derivative action may also be included to correct for rapid variations from the control point.

In the present control, correction is applied intermittently. The amount of correction applied is always such that the indicated error is compensated for in one control cycle. Should the load conditions change, the control valve is again re-positioned in one control cycle and remains in the new position as long as the changed load conditions are maintained. As the amount of correction applied is always proportional to the indicated error, a rapid change is also corrected in one control cycle. Thus, while there is only one proportional action, re-set action is also applied and some features of derivative control are also obtained.

This application is a continuation of my pending application S.N. 463,458, filed October 20, 1954, now abandoned.

What is claimed is:

1. In a servo system, the combination of electro-mechanical motive means normally at standstill, means for continuously providing a continuously variable error signal, circuit means for generating a timing signal having a duration period that is continuously variable in accordance with the instant magnitude of the error signal in a sense increasing from zero on up with the magnitude of the error signal increasing from substantially zero on up, said duration being independent of the polarity of said error signal, circuit means for selectively energizing said motive means for movement in one direction or the other in accordance with the polarity of said error signal, and circuit means for deenergizing said motive means at the end of said period.

2. In a servo system, the combination of electro-mechanical motive means normally at standstill, means for continuously providing a continuously variable error signal, switching means normally in a first significant circuit state and switchable therefrom to alternate second and third significant circuit states in accordance with the polarity of said error signal, means for energizing said motive means for movement in one direction or the other responsive to assumption by said switching means of said second and third states respectively, circuit means for generating a timing signal having a duration period that is continuously variable in accordance with the instant magnitude of the error signal in a sense increasing from zero on up with the magnitude of the error signal increasing substantially from zero on up, said duration being independent of the polarity of said error signal, and means for deenergizing said motive means at the end of said period.

3. In a servo system, the combination of electro-mechanical motive means normally at standstill, means for continuously providing a continuously variable error signal, circuit means for generating a timing signal having a duration period that is continuously variable in accordance with the instant magnitude in a sense increasing from zero on up with the magnitude of the error signal increasing from substantially zero on up, said duration being independent of the polarity of said error signal, first electro-mechanical switching means including a contact normally in a first significant switching position and switchable therefrom to second and third significant switching positions in accordance with the polarity of the error signal, second electro-mechanical switching operatively connected to said timing signal generator and experiencing a change in switching state at the end of said period, and circuit means for energizing said motive means for movement in one direction or the other responsive to assumption by said contact of its said second and third positions respectively and for deenergizing the same responsive to said change in switching state.

4. The combination as in claim 3 wherein the timing signal generator includes as timing elements a resistor and a capacitor operative to produce a timing voltage in accordance with the magnitude of the error signal determinative of the aforesaid duration period.

5. The combination as in claim 4 wherein the timing signal generator includes an amplifying device having a control terminal and first and second output terminals, supply circuit means connected across said output terminals, the control terminal being operatively connected during the energization of the motive means to the aforesaid resistor and capacitor to produce at the first output terminal in accordance with the aforesaid timing voltage the aforesaid timing signal effective at its termination to deenergize the motive means.

6. The combination as in claim 5 wherein the amplifying device is an electron tube, its first and second output terminals being its plate and cathode and the control terminal being its grid.

References Cited in the file of this patent

UNITED STATES PATENTS 2,790,945    Chope _____ Apr. 30, 1957